US012617048B2

(12) United States Patent
Son et al.

(10) Patent No.: US 12,617,048 B2
(45) Date of Patent: May 5, 2026

(54) WELDING APPARATUS INCLUDING ELECTRODE TAB FIXING PORTION

(71) Applicant: LG Energy Solution, Ltd., Seoul (KR)

(72) Inventors: Gil Sang Son, Daejeon (KR); Jin Hak Kong, Daejeon (KR); Dong Yeon Kim, Daejeon (KR); Kyu Hyun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 744 days.

(21) Appl. No.: 17/915,295

(22) PCT Filed: Aug. 23, 2021

(86) PCT No.: PCT/KR2021/011177
§ 371 (c)(1),
(2) Date: Sep. 28, 2022

(87) PCT Pub. No.: WO2022/085917
PCT Pub. Date: Apr. 28, 2022

(65) Prior Publication Data
US 2023/0140192 A1 May 4, 2023

(30) Foreign Application Priority Data

Oct. 21, 2020 (KR) ........................ 10-2020-0136428

(51) Int. Cl.
H01M 50/54 (2021.01)
B23K 20/10 (2006.01)
(Continued)

(52) U.S. Cl.
CPC .......... B23K 37/0443 (2013.01); B23K 20/10 (2013.01); B23K 20/26 (2013.01);
(Continued)

(58) Field of Classification Search
CPC .. H01M 50/536; H01M 50/54; H01M 50/538; B23K 37/0443; B23K 20/10; B23K 20/26; B23K 2101/36; Y02E 60/10
See application file for complete search history.

(56) References Cited

U.S. PATENT DOCUMENTS 2,287,802 A 6/1942 Hill
4,764,182 A 8/1988 Bish et al.
(Continued)

FOREIGN PATENT DOCUMENTS

CN 106663772 A 5/2017
JP 2012169209 A * 9/2012
(Continued)

OTHER PUBLICATIONS

Richardson et al, "Process development of electrode-tab welds for aerospace, lithium-ion cells," Collection of Technical Papers. 35th Intersociety Energy Conversion Engineering Conference and Exhibit (IECEC) (Cat. No. 00CH37022), Las Vegas, NV, USA, 2000, pp. 651-658. (Year: 2000).*
(Continued)

*Primary Examiner* — A. Dexter Tugbang
(74) *Attorney, Agent, or Firm* — Lerner David LLP

(57) ABSTRACT
A welding apparatus may include an electrode tab fixing portion capable of maintaining the distance between and the shape of electrode tabs while minimizing damage to electrode tabs when welding the electrode tabs.

12 Claims, 3 Drawing Sheets

(51) Int. Cl.

| | | |
|---|---|---|
| *B23K 20/26* | (2006.01) |
| *B23K 37/04* | (2006.01) |
| *H01M 50/536* | (2021.01) |
| *B23K 101/36* | (2006.01) |
| *H01M 50/538* | (2021.01) |

(52) U.S. Cl.

CPC ......... *H01M 50/536* (2021.01); *H01M 50/54* (2021.01); *B23K 2101/36* (2018.08); *H01M 50/538* (2021.01); *Y02E 60/10* (2013.01)

(56) References Cited

U.S. PATENT DOCUMENTS

| | | | |
|---|---|---|---|
| 6,242,128 | B1 | 6/2001 | Tura et al. |
| 2016/0020434 | A1 | 1/2016 | Kwon et al. |
| 2017/0040635 | A1 | 2/2017 | Choi et al. |
| 2019/0148705 | A1 | 5/2019 | Park et al. |
| 2020/0259158 | A1* | 8/2020 | Motohashi ........... H01M 50/54 |
| 2020/0287196 | A1 | 9/2020 | Choi et al. |

FOREIGN PATENT DOCUMENTS

| | | | |
|---|---|---|---|
| JP | 2016505204 | A | 2/2016 |
| JP | 2019067569 | A | 4/2019 |
| JP | 2019207794 | A | 12/2019 |
| KR | 20030066172 | A | 8/2003 |
| KR | 20090093222 | A | 9/2009 |
| KR | 20130050616 | A | 5/2013 |
| KR | 20160007109 | A | 1/2016 |
| KR | 20180072065 | A | 6/2018 |
| KR | 20190054617 | A | 5/2019 |
| KR | 20190132963 | A | 11/2019 |
| KR | 20200018977 | A | 2/2020 |
| KR | 20200105272 | A | 9/2020 |
| WO | 2017-146369 | A1 | 8/2017 |

OTHER PUBLICATIONS

International Search Report for PCT/KR2021/011177 mailed Nov. 10, 2021. 3 pgs.
Extended European Search Report including Written Opinion for Application No. 21882990.1 dated Aug. 25, 2023, pp. 1-9.

\* cited by examiner

【FIG. 1】
-- Prior Art --
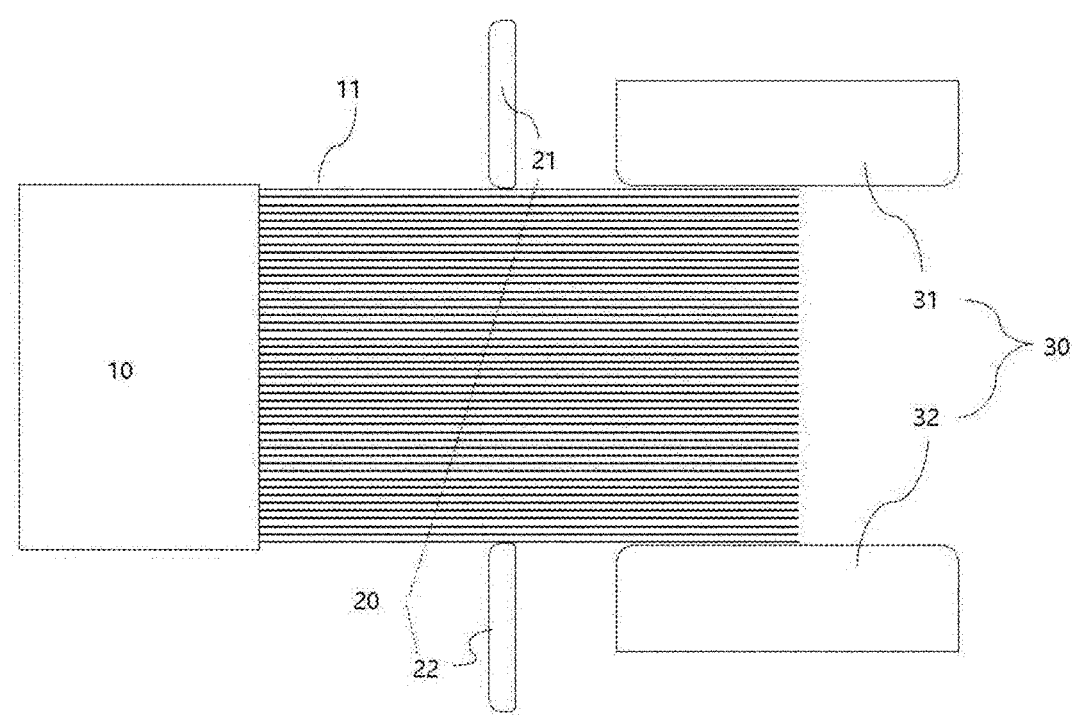
【FIG. 2】
-- Prior Art --
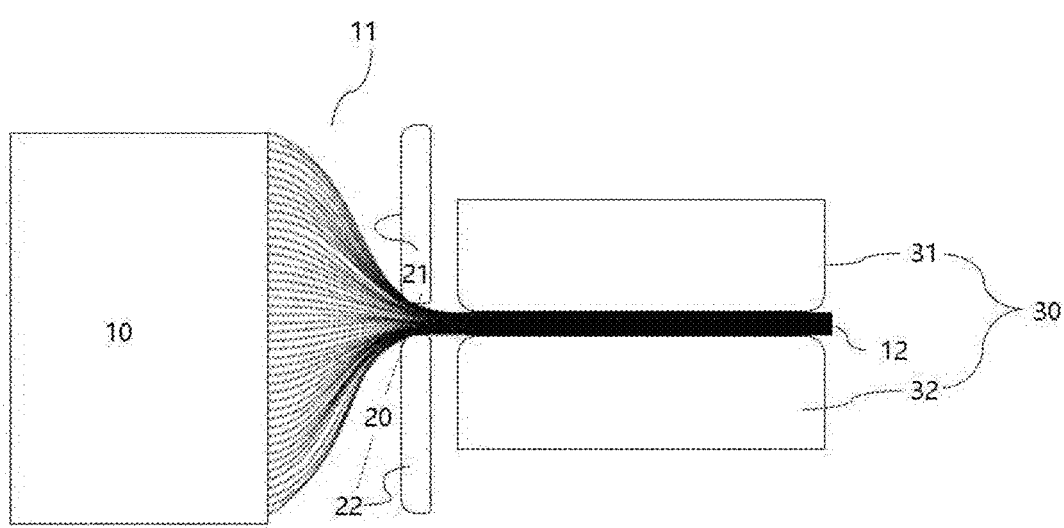

【FIG. 3】
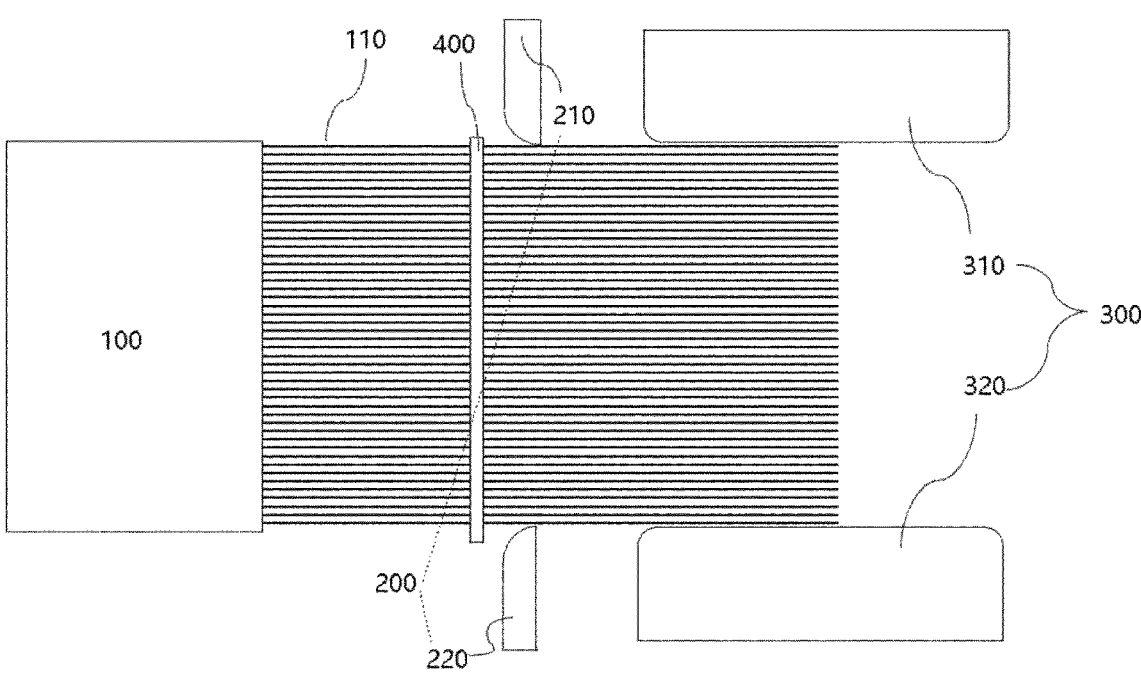
【FIG. 4】
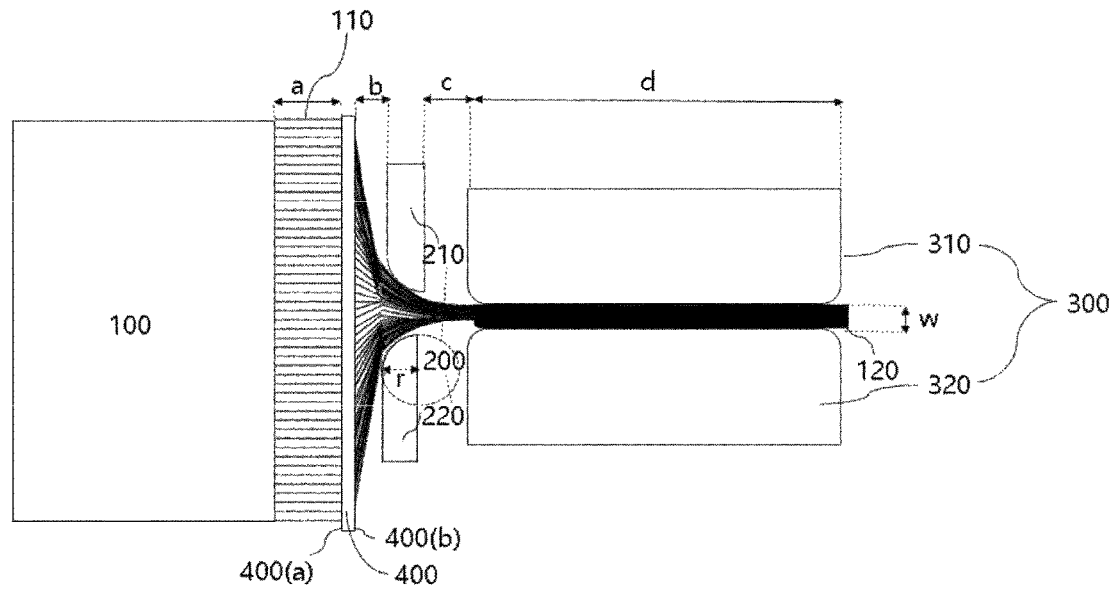

【FIG. 5】
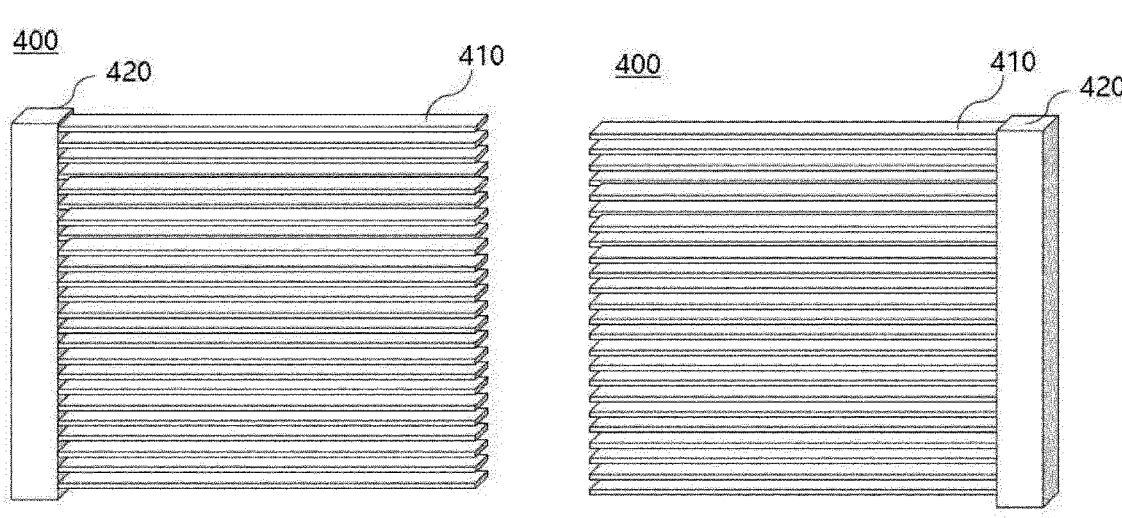

WELDING APPARATUS INCLUDING ELECTRODE TAB FIXING PORTION

CROSS-REFERENCE TO RELATED APPLICATIONS

This application is a national stage entry under 35 U.S.C. § 371 of International Application No. PCT/KR2021/011177, filed on Aug. 23, 2021, which claims priority to Korean Patent Application No. 10-2020-0136428, filed on Oct. 21, 2020, the disclosures of which are hereby incorporated herein by reference in their entireties.

The present invention relates to a welding apparatus including an electrode tab fixing portion and an electrode tab welding method using the same, and more particularly to a welding apparatus including a tab guide configured to gather electrode tabs and an electrode tab fixing portion configured to prevent damage to the electrode tabs when the electrode tabs are gathered by the tab guide and an electrode tab welding method using the same.

BACKGROUND ART

With recent diversification of devices that use batteries, demand for high-capacity and high-density batteries has increased. Thereamong, a lithium secondary battery, which has high energy density and discharge voltage, has been commercialized and used in various forms.

As an example, secondary batteries are classified into a cylindrical secondary battery, a prismatic secondary battery, and a pouch-shaped secondary battery depending on the shape thereof. In addition, a secondary battery may have a structure in which an electrode assembly is received in any one of various cases.

The electrode assembly may be a jelly-roll type assembly, which is configured to have a structure in which a long sheet type positive electrode and a long sheet type negative electrode are wound in the state in which a separator is interposed therebetween, a stacked type assembly which is configured to have a structure in which a rectangular positive electrode and a rectangular negative electrode are stacked in the state in which a separator is interposed therebetween, a stacked and folded type assembly, which is configured to have a structure in which unit cells are wound using a long separation film, or a laminated and stacked type assembly, which is configured to have a structure in which unit cells are stacked and attached to each other in the state in which a separator is interposed therebetween.

Thereamong, an electrode assembly configured to have a structure in which one or more positive electrodes and one or more negative electrodes are stacked, such as a stacked type assembly, a stacked and folded type assembly, or a laminated and stacked type assembly, is preferred for reasons that the capacity of the electrode assembly compared to the density thereof is increased, the electrode assembly is easily manufactured, and the shape of the electrode assembly is easily changed.

In the stacked type electrode assembly, electrode tabs protruding from the electrode assembly are gathered and welded to an electrode lead, which is electrically connected to the outside.

FIG. 1 is a schematic view of a stacked type electrode assembly before being pressed by a conventional welding apparatus, and FIG. 2 is a schematic view of the stacked type electrode assembly after being pressed by the conventional welding apparatus.

As can be seen from FIGS. 1 and 2, the conventional welding apparatus welds an electrode assembly 10 and a plurality of electrode tabs 11 protruding from the electrode assembly 10. The electrode assembly 10 may be any one of a stacked type assembly, a stacked and folded type assembly, and a laminated and stacked type assembly. The electrode tabs 11 are gathered by a tab guide 20 to form a tab bundle 12, and the tab bundle is pressed and welded through a welding jig 30 constituted by a horn 31 and an anvil 32.

The horn 31 and the anvil 32 apply high-frequency vibration generated by an ultrasonic wave having a high frequency of about 20 kHz, and vibration energy is converted into thermal energy between the electrode tabs 11 and an electrode lead, whereby rapid welding is performed therebetween.

However, ultrasonic welding using vibration energy may shock the electrode assembly 10, the electrode tabs 11, and the electrode lead, and cutting of the electrode tabs 11 or between the electrode tabs 11 and the electrode lead may be caused. In order to prevent this, the conventional welding apparatus secures a relatively long length of the electrode tabs 11 through the tab guide 20.

The tab guide 20 may be constituted by at least two tab guides, such as an upper tab guide 21 and a lower tab guide 22, and the length of the electrode tabs 11 may be secured using one tab guide 20.

When the electrode tabs 11 are gathered while being pressed by the tab guide 20, however, the electrode tabs 11 may be damaged, or the electrode tabs 11 may be cut at the portion of the electrode tabs at which the electrode tabs are gathered by the tab guide 20. In particular, when the electrode tabs 11 are pressed at a steep angle, a danger of the electrode tabs 11 being cut is further increased.

In Patent Document 1, an electrode tab is pressed such that the shape of the electrode tab is changed, as mentioned above; however, this document does not recognize problems of damage to or cutting of the electrode tab.

In Patent Document 2, a connection portion between an electrode tab and an electrode lead is formed, and the position of a jig is adjusted when the connection portion is formed so as to have a V shape; however, it is not possible to prevent the electrode tab from being cut.

Therefore, a construction for preventing an electrode tab from being cut when the electrode tab is welded is needed.

PRIOR ART DOCUMENTS (Patent Document 1) Korean Patent Application Publication No. 2003-0066172 (Aug. 9, 2003)
(Patent Document 2) Korean Patent Application Publication No. 2016-0007109 (Jan. 20, 2016)

DISCLOSURE

Technical Problem

The present invention has been made in view of the above problems, and it is an object of the present invention to provide a welding apparatus configured to prevent electrode tabs from being cut when the electrode tab is welded and an electrode tab welding method using the same.

It is another object of the present invention to maintain uniform distance between the welded electrode tabs in order to prevent damage to the electrode tabs.

It is a further object of the present invention to secure an additional length for outer electrode tabs in order to prevent damage to the electrode tabs due to internal force and external force.

Technical Solution

In order to accomplish the above objects, a welding apparatus according to the present invention includes a tab guide configured to gather a plurality of electrode tabs protruding from an electrode assembly in order to form a tab bundle, a welding jig configured to weld the tab bundle, and an electrode tab fixing portion disposed between the electrode assembly and the tab guide, the electrode tab fixing portion being configured to maintain a space between the electrode tabs.

The electrode tab fixing portion may include a left fixing portion disposed between the electrode tabs at a left side of the electrode tabs and a right fixing portion disposed between the electrode tabs at a right side of the electrode tabs.

The left fixing portion and the right fixing portion may be inserted between the electrode tabs so as to be opposite each other at opposite sides thereof.

The electrode tab fixing portion may include insertion portions configured to be inserted between the electrode tabs and a body portion configured to allow the insertion portions to be disposed spaced apart from each other therein.

The insertion portions may be inserted between the electrode tabs in parallel to the electrode tabs.

The insertion portions may be inserted between the electrode tabs in a fitting manner.

The electrode tab fixing portion may be disposed closer to the tab guide than the electrode assembly.

The tab guide may include an upper tab guide configured to gather the electrode tabs above the electrode tabs and a lower tab guide configured to gather the electrode tabs under the electrode tabs.

The upper tab guide and the lower tab guide may press the electrode tabs in a state of partially facing each other in parallel to form the tab bundle.

The portion of the tab guide that faces the electrode tabs may be curved.

The electrode tab facing portion of the tab guide may have an inclined curve structure configured such that the portion of the tab guide farthest from the electrode assembly further protrudes to bend the electrode tabs.

The welding jig may perform welding using ultrasonic waves.

The welding jig may be constituted by a horn and an anvil.

The welding jig may weld the portion of the tab bundle farthest from the electrode assembly.

In addition, the present invention provides an electrode tab welding method including (a) disposing an electrode tab fixing portion between electrode tabs of an electrode assembly configured to have a structure in which pluralities of positive electrodes, separators, and negative electrodes are stacked, (b) gathering the electrode tabs fixed by the electrode tab fixing portion through a tab guide to form a tab bundle, and (c) welding the tab bundle.

The electrode tab welding method may further include fixing the electrode assembly before step (a).

In step (b), the tab guide may be disposed farther away from the electrode assembly than the electrode tab fixing portion.

In the present invention, one or more constructions that do not conflict with each other may be selected and combined from among the above constructions.

Advantageous Effects

In the present invention, the length of electrode tabs is maximally set through a tab guide between the electrode tabs when the electrode tabs are welded, whereby force applied to the electrode tabs when the electrode tabs are bent is minimized, and therefore damage to the electrode tabs and an electrode assembly is prevented when the electrode tabs are pressed.

In addition, a process of forming a tab bundle when the electrode tabs are welded is easily performed.

Furthermore, the electrode tabs are gently pressed through the tab guide, whereby electrode tabs having a desired shape are obtained.

DESCRIPTION OF DRAWINGS

FIG. 1 is a schematic view of a stacked type electrode assembly before being pressed by a conventional welding apparatus.

FIG. 2 is a schematic view of the stacked type electrode assembly after being pressed by the conventional welding apparatus.

FIG. 3 is a schematic view of a stacked type electrode assembly before being pressed by a welding apparatus according to the present invention.

FIG. 4 is a schematic view of the stacked type electrode assembly after being pressed by the welding apparatus according to the present invention.

FIG. 5 is a perspective view of an electrode tab fixing portion according to the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a welding apparatus according to the present invention and an electrode tab welding method using the same will be described in detail with reference to the accompanying drawings.

FIG. 3 is a schematic view of a stacked type electrode assembly before being pressed by a welding apparatus according to the present invention, and FIG. 4 is a schematic view of the stacked type electrode assembly after being pressed by the welding apparatus according to the present invention.

As can be seen from FIGS. 3 and 4, the welding apparatus according to the present invention includes a tab guide 200 configured to gather a plurality of electrode tabs 110 pro-truding from an electrode assembly 100 in order to form a tab bundle 120, a welding jig 300 configured to weld the tab bundle 120, and an electrode tab fixing portion 400 disposed between the electrode assembly 100 and the tab guide 200, the electrode tab fixing portion being configured to maintain the distance between the electrode tabs 110.

The electrode assembly 100 may have a structure in which a positive electrode, a separator, and a negative electrode are stacked. The separator is located between the positive electrode and the negative electrode to electrically isolate the positive electrode and the negative electrode from each other.

The electrode assembly 100 may be a stacked type assembly including unit cells, each of which is configured to have a structure in which a rectangular positive electrode and a rectangular negative electrode are stacked in the state in which a separator is interposed therebetween, a stacked and folded type assembly, which is configured to have a structure in which unit cells are wound using a long sepa-ration film, or a laminated and stacked type assembly, which is configured to have a structure in which unit cells are stacked in the state in which a separator is interposed therebetween and are then attached to each other.

The electrode tab 110 may extend in a direction parallel to electrode plates of the electrode assembly 100. Electrode tabs 110 having the same polarity extend in the same direction as the electrode assembly 100. At this time, a positive electrode tab and a negative electrode tab may extend in the same direction as the electrode assembly 100, or may extend in different directions.

The electrode tab 110 may be made of a material that has high conductivity, such as aluminum, copper, or carbon nanotubes. In addition, all materials suitable for the elec-trode tab 110 may be generally used.

The electrode tab 110 is pressed in a predetermined direction by the tab guide 200. As an example, the tab guide 200 may bend one or more electrode tabs 110 at an incli-nation of 5 to 40 degrees to form the tab bundle 120. If the inclination of the electrode tab 110 is too small, a sufficient length may not be secured in order to bend the electrode tab 110 and to prevent breakage of the electrode tab 110. If the inclination of the electrode tab 110 is too large, the space occupied by the electrode tab 110 may be large, whereby the shape and capacity of a battery may be adversely affected, and some of the electrode tabs 110 may overlap each other and thus may be cut due to movement of the battery.

The thickness w of the tab bundle 120 may be generally 0.1 mm to 1.5 mm, although the thickness of the tab bundle may be changed depending on the electrode assembly 100.

The tab bundle 120 may be connected to an electrode lead by welding, or may be directly connected to an external device. The tab bundle 120 may be connected to one side of the electrode lead or opposite sides of the electrode lead by joining. A welding tape may be adhered to one surface of the electrode tab 110, whereby joining with the electrode lead or the external device may be easily performed.

The welding tape is a double-sided tape having an adhe-sive material applied to opposite surfaces thereof. As an example, the welding tape may have a structure in which an adhesive is applied to opposite surfaces of a cast polypro-pylene (CPP) film. An acrylic-based adhesive, a silicone-based adhesive, or hot melt may be used as the adhesive.

In order to easily connect the tab bundle 120 to the electrode lead or the external device, the tab bundle 120 may be joined by a welding jig 300 after the tab bundle 120 is formed by the tab guide 200. Joining may be performed by welding or using ultrasonic waves.

As an example, when joining is performed using ultra-sonic waves, high-frequency vibration generated by ultra-sonic waves having a high frequency of about 20 kHz may be applied, and a horn 310 and an anvil 320 may be operated above and under the tab bundle 120, whereby vibration energy may be converted into thermal energy through fric-tion, and therefore rapid welding may be performed.

In the state in which the electrode assembly 100, the tab guide 200, and the welding jig 300 are disposed in that order, the welding jig 300 may weld a joint d farthest from the electrode assembly 100, which is a portion of the total length c+d of the tab bundle 120, in which the electrode tabs 110 are gathered, from which a non-joint c is excluded. That is, the portion excluding the non-joint c, which is a small thickness portion of the tab bundle 120, in which the electrode tabs 110 are gathered, i.e. the portion of the tab bundle in which the electrode tabs 110 are not cut even when the electrode tabs are gathered and pressed. It is preferable for the minimum welding length of the tab bundle 120 that is connected to the electrode lead or the external device to be 2 mm or more.

This may be a point corresponding to ⅕ to ⅓ of the total length of the tab bundle 120 based on the portion close to the electrode assembly, which, however, may be changed depending on the thickness of the electrode assembly and the length of the tab bundle 120.

The corner of the tab guide 200 that faces the electrode tab 110 may be curved in order to prevent damage to the electrode tab 110. The radius of curvature r of the tab guide 200 may be 0.5 mm to 2 mm in order to accurately change the position of the electrode tab 110 at a desired portion while preventing damage to the electrode tab 110. If the radius of curvature r is less than the above range, the electrode tab 110 may be damaged due to the tab guide 200. If the radius of curvature r is greater than the above range, the tab guide 200 may not bend the electrode tab 110 at a desired portion into a desired shape.

The portion of the tab guide 200 that faces the electrode tab 110 may be configured such that the part thereof farthest from the electrode assembly 100 further protrudes to bend the electrode tab 110. The part of the tab guide 200 farthest from the electrode assembly 100 is formed so as to further protrude, whereby the electrode tabs 110 may be naturally bent into a single tab bundle 120. In order to naturally form the tab bundle 120, it is preferable for the electrode tab facing portion of the tab guide 200 to have an inclined curve structure configured such that the portion of the tab guide farthest from the electrode assembly further protrudes to bend the electrode tab, as shown in FIGS. 3 and 4.

In addition, although the electrode tab 110 may be bent using only one tab guide 200, a pair of an upper tab guide 210 and a lower tab guide 220 or a plurality of tab guides 200 may be provided in order to bend the electrode tab 110 at a desired position to a desired extent.

In the case in which the pair of the upper tab guide 210 and the lower tab guide 220 or the plurality of tab guides 200 is provided, the upper tab guide 210 may bend the electrode tab 110 further downwards while the lower tab guide 220 may bend the electrode tab 110 further upwards based on a middle portion of the electrode tab 110, i.e. a position at which the tab bundle 120 is formed. That is, in the figure, the upper tab guide 210 and the lower tab guide 220 may press the electrode tab 110 in a state of partially facing each other in parallel.

As a result, a free space is formed between the electrode tabs 110, whereby it is possible to prevent the electrode tabs 110 from being cut by external impact or movement of the electrode assembly 110.

The thickness of the tab guide 210 may be 1 mm to 2 mm in consideration of the length of the electrode tab 110. However, the thickness of the tab guide 210 may be changed depending on the thickness of the electrode tab 110 and the size of the electrode assembly 100.

The electrode tab fixing portion 400 may be disposed between the electrode assembly 100 and the tab guide 210 in order to maintain a separation space between one electrode tab 110 and another electrode tab 110. When only the tab guide 200 is simply provided, the distance between the welding jig 300 and the electrode assembly 100 must be increased, and the distance between the electrode assembly and the tab guide 200 must also be maintained uniform, in order to gently form a bending angle. In the case in which the electrode tab fixing portion 400 is provided, however, it is possible to reduce the distance between the electrode assembly 100 and the tab guide 200.

FIG. 5 is a perspective view of an electrode tab fixing portion according to the present invention.

As shown in FIG. 5, the electrode tab fixing portion 400 may include a left fixing portion disposed between the electrode tabs 110 at the left side of the electrode tabs 110 and a right fixing portion disposed between the electrode tabs 110 at the right side of the electrode tabs 110. In the case in which a pair of electrode tab fixing portions 400 is provided, as described above, it is possible to easily insert the electrode tab fixing portions 400 between the electrode tabs 110. That is, the pair of electrode tab fixing portions 400 may be inserted between the electrode tabs 110 so as to be opposite each other at opposite sides thereof, whereby the separation space may be formed between the electrode tabs 110.

The electrode tab fixing portion 400 may include insertion portions 410 configured to be inserted between the electrode tabs 110 and a body portion 420 in which the insertion portions 410 are disposed spaced apart from each other.

The insertion portions 410 may be inserted between the electrode tabs 110 in parallel to the electrode tabs 110. At this time, the insertion portions 410 may be inserted between the electrode tabs 110 in a fitting manner. The insertion portion 410 may be configured to have a structure in which the thickness of a region 400($a$) close to the electrode assembly 100 is greater than the thickness of a region 400($b$) close to the tab guide 200 in order to guide the electrode tabs 110 in a predetermined direction.

The insertion portion 410 may be made of an electrically insulative material in order to prevent deterioration in performance of the electrode assembly 100. The electrically insulative material is not limited as long as the electrically insulative material is not curved or deformed when the electrode tab 110 is bent by the tab guide 200. As an example, the insertion portion 410 may be made of plastic or a polymer composite resin having insulation properties, such as rubber having predetermined rigidity, polyimide (PI), polysulfone (PSF), poly phenylene sulfide (PPS), polyamide imide (PAI), polyacrylate (PAR), polyether sulfone (PES), polyether ether ketone (PEEK), polyether imide (PEI), liquid crystal polyester (LCP), or polyether ketone (PEK), plastic or a polymer composite resin having insulation properties, such as polytetrafluoroethylene (PTFE), polypropylene (PP), polyethylene (PE), or polyvinyl chloride (PVC), or a fiber-reinforced polymer composite resin having glass or aramid fiber inserted thereinto in order to improve elasticity.

In addition, a portion of the electrode tab fixing portion 400 may be made of an elastic material. When the electrode tab fixing portion 400 is made of an elastic material, it is possible to prevent damage to the electrode tab 110. The elastic material may be disposed at only the portion that faces the electrode tab 110 or the portion at which the electrode tab 110 is bent.

The electrode tab fixing portion 400 may be disposed in the order of electrode assembly 100, the electrode tab fixing portion 400, and the tab guide 200. The electrode tab fixing portion 400 may be disposed at a distance of 0 mm to 2.0 mm from the end of the separator of the electrode assembly 100, and the tab guide 200 may be disposed at a distance of 0 mm to 2.0 mm from the electrode tab fixing portion 400. At this time, the electrode tab fixing portion 400 may be disposed such that the distance b from the tab guide 200 is less than the distance a from the electrode assembly 100, whereby the electrode tab 110 may be easily bent by the tab guide 200.

In addition, the electrode tab fixing portion 400 may be disposed between the tab guides 200 such that the electrode tab 110 is naturally shaped by the tab guide 200. As an example, in the case in which the upper tab guide 210 and the lower tab guide 220 do not bend the electrode tab at the position at which the upper tab guide and the lower tab guide are opposite each other, the tab guide 200 may be disposed such that the electrode tabs 110 are naturally shaped between the tab guides 200.

In addition, when the distance a+b+c from the electrode assembly to the joint is limited, the electrode tab 110 may be configured such that the outer tab length of the electrode tab is increased, whereby it is possible to reduce damage to the electrode tab 110 due to deformation of the tab bundle 120 in a horizontal direction and deformation of the electrode assembly 100 in a thickness direction.

In order to fix the electrode assembly 100 when the electrode tab 110 is bent by the tab guide 200, a plate configured to fix the lower part of the electrode assembly and a pusher configured to hold the electrode assembly at the upper part of the electrode assembly may be provided. At this time, both the plate and the pusher may push the electrode assembly, or only one of the plate and the pusher may push the electrode assembly. In addition, the plate and/or the pusher may have fixing portions in X-axis and Y-axis directions in order to prevent movement of the electrode assembly.

An electrode tab welding method according to the present invention may include (a) a step of disposing an electrode tab fixing portion between electrode tabs of an electrode assembly configured to have a structure in which pluralities of positive electrodes, separators, and negative electrodes are stacked, (b) a step of gathering the electrode tabs fixed by the electrode tab fixing portion through a tab guide to form a tab bundle, and (c) a step of welding the tab bundle.

In the case in which the electrode tab fixing portion is disposed between the electrode tabs, as described above, the distance between the tab guide and the electrode assembly may be further reduced, and when the electrode tab is bent by the tab guide, the electrode tab may be more naturally shaped.

In addition, the tab bundle is welded after the electrode tabs are fixed by the tab guide, whereby a possibility of the electrode tab being cut or deformed is reduced, and therefore it is possible to prevent damage to the electrode tab.

The electrode tab welding method according to the present invention may further include a step of fixing the electrode assembly before step (a). This step is performed in order to prevent the electrode tab from not being formed into a desired shape or being cut due to movement of the electrode assembly. Additionally, when the electrode tab of the electrode assembly is bent by the tab guide, it is possible to prevent force necessary to bend the electrode tab from being reduced due to movement of the electrode assembly.

In step (b), the tab guide may be disposed farther away from the electrode assembly than the electrode tab fixing portion. As the result of this disposition, it is possible to prevent damage to the electrode tab due to abrupt force while pressing the electrode tab so as to have a desired shape.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

10, 100: Electrode assemblies
11, 110: Electrode tabs
12, 120: Tab bundles
20, 200: Tab guides
21, 210: Upper tab guides
22, 220: Lower tab guides
30, 300: Welding jigs
31, 310: Horns
32, 320: Anvils
400: Electrode tab fixing portion
400(a): Region close to electrode assembly
400(b): Region close to tab guide
410: Insertion portion
420: Body portion
a: Distance from electrode assembly
b: Distance from tab guide
c: Non-joint
d: Joint
r: Radius of curvature
w: Thickness of tab bundle
The invention claimed is:

1. A welding apparatus comprising:
a tab guide assembly configured to gather a plurality of electrode tabs protruding from an electrode assembly to form a single tab bundle;
a welding jig configured to weld the single tab bundle; and
an electrode tab fixing assembly configured to be disposed between the electrode assembly and the tab guide assembly, the electrode tab fixing assembly being configured to maintain a space between the electrode tabs of the single tab bundle, the electrode tab fixing assembly comprising left and right fixing portions configured to be disposed between adjacent ones of the electrode tabs at left and right opposite lateral sides of each of the electrode tabs, respectively,
wherein the left and right opposite lateral sides of the electrode tabs extend away from the electrode assembly in an extension direction of the electrode tabs, and
wherein the left and right fixing portions are separable from one another and removable from the single tab bundle after welding.

2. The welding apparatus according to claim 1, wherein the electrode tab fixing assembly comprises:
insertion portions configured to be inserted between adjacent ones of the electrode tabs; and
a body portion coupled to the insertion portions, the body portion maintaining the insertion portions spaced apart from each other therein.

3. The welding apparatus according to claim 2, wherein the insertion portions are configured to be inserted between the electrode tabs parallel to the electrode tabs.

4. The welding apparatus according to claim 3, wherein the insertion portions are configured to be inserted between the electrode tabs in a tight-fitting manner.

5. The welding apparatus according to claim 1, wherein the welding apparatus is configured such that the electrode tab fixing assembly is configured to be disposed closer to the tab guide assembly than the electrode assembly.

6. The welding apparatus according to claim 1, wherein the tab guide assembly comprises:
an upper tab guide configured to press against the electrode tabs from a position above the electrode tabs; and
a lower tab guide configured to press against the electrode tabs from a position under the electrode tabs.

7. The welding apparatus according to claim 6, wherein the upper tab guide and the lower tab guide are configured to press the electrode tabs partially facing each other and oriented parallel to one another while forming the single tab bundle.

8. The welding apparatus according to claim 1, wherein a portion of the tab guide assembly that faces the electrode tabs is curved.

9. The welding apparatus according to claim 8, wherein the portion of the tab guide assembly that faces the electrode tabs has an inclined curve shape configured such that when the tab guide assembly is disposed adjacent to the electrode tabs, a portion of the tab guide assembly farthest from the electrode assembly is closest to the electrode tabs.

10. The welding apparatus according to claim 1, wherein the welding jig is configured to perform welding using ultrasonic waves.

11. The welding apparatus according to claim 10, wherein the welding jig includes a horn and an anvil.

12. The welding apparatus according to claim 1, wherein the welding jig is configured to weld a portion of the single tab bundle farthest from the electrode assembly.

* * * * *